United States Patent
Szalai et al.

(10) Patent No.: US 11,948,028 B2
(45) Date of Patent: Apr. 2, 2024

(54) ITEM TRACKING USING TAG-TO-TAG COMMUNICATIONS

(71) Applicant: International Business Machines Corporation, Armonk, NY (US)

(72) Inventors: Zsolt Szalai, Tourrettes-sur-Loup (FR); Joel Viale, Vence (FR); Frédéric Bauchot, Saint-Jeannet (FR)

(73) Assignee: International Business Machines Corporation, Armonk, NY (US)

( * ) Notice: Subject to any disclaimer, the term of this patent is extended or adjusted under 35 U.S.C. 154(b) by 279 days.

(21) Appl. No.: 17/185,643

(22) Filed: Feb. 25, 2021

(65) Prior Publication Data
US 2022/0269915 A1 Aug. 25, 2022

(51) Int. Cl.
*G06K 17/00* (2006.01)
*H04W 84/18* (2009.01)

(52) U.S. Cl.
CPC ......... *G06K 17/0029* (2013.01); *H04W 84/18* (2013.01)

(58) Field of Classification Search
CPC ................. G06K 17/0029; H04W 84/18
See application file for complete search history.

(56) References Cited

U.S. PATENT DOCUMENTS

| | | | |
|---|---|---|---|
| 7,880,613 B1 * | 2/2011 | Maeng | G08B 21/0275 340/568.1 |
| 7,916,025 B2 | 3/2011 | Locker et al. | |
| 2004/0036623 A1 | 2/2004 | Chung | |
| 2004/0212480 A1 | 10/2004 | Carrender et al. | |
| 2008/0079578 A1 | 4/2008 | Kim et al. | |
| 2008/0088125 A1 * | 4/2008 | Montross | G09F 3/08 283/80 |
| 2008/0136634 A1 * | 6/2008 | Porte | G06Q 10/087 340/572.1 |
| 2008/0231426 A1 * | 9/2008 | Kamel | G06Q 10/087 340/10.4 |
| 2009/0315679 A1 * | 12/2009 | Bauchot | G08C 21/00 340/10.1 |
| 2010/0097184 A1 | 4/2010 | Bauchot et al. | |
| 2012/0126949 A1 | 5/2012 | Downie et al. | |
| 2012/0161967 A1 * | 6/2012 | Stern | G06Q 10/087 340/572.1 |
| 2015/0220762 A1 * | 8/2015 | Jiang | G06K 7/10128 235/375 |
| 2016/0224814 A1 * | 8/2016 | Stiefel | G06Q 10/087 |

OTHER PUBLICATIONS

Mell et al., "The NIST Definition of Cloud Computing," Recommendations of the National Institute of Standards and Technology, U.S. Department of Commerce, Special Publication 800-145, Sep. 2011, 7 pgs.

* cited by examiner

*Primary Examiner* — Thomas D Alunkal
(74) *Attorney, Agent, or Firm* — Peter J. Edwards

(57) ABSTRACT

Provided is a method for tracking items using tag-to-tag communication. The method comprises receiving, from a tag, a list of nearby tags. The list of nearby tags was generated by the tag communicating with neighboring tags. The method further comprises comparing the list of nearby tags to a reference list that includes all expected tags. The method further comprises determining whether the list of nearby tags matches the reference list.

18 Claims, 8 Drawing Sheets

| | LID | AId1 | FId1 | AId2 | FId2 | AId3 | ... | FIdn | AIdn |
|---|---|---|---|---|---|---|---|---|---|
| 320 | L101-1 | RST | 4752 | MSP | 4120 | JFK | ... | 2112 | CDG |

| | LID | AId1 | FId1 | AId2 | FId2 | AId3 | ... | FIdn | AIdn |
|---|---|---|---|---|---|---|---|---|---|
| 420 | L101-1 | RST | 4752 | MSP | 4120 | JFK | ... | 2112 | CDG |
| 422 | L101-2 | RST | 4752 | MSP | | | ... | | |
| 424 | L101-3 | RST | 4752 | MSP | 3614 | ATL | ... | | |
| 426 | L102-7 | ORD | 1253 | RST | 4752 | MSP | ... | | |
| 428 | L101-4 | RST | 4752 | MSP | 3860 | ATL | ... | | |

ITEM TRACKING USING TAG-TO-TAG COMMUNICATIONS

BACKGROUND

The present disclosure relates generally to the field of computing, and more particularly to tags capable of building a list of neighboring tags using tag-to-tag communications.

Short-range wireless communication technologies, such as Bluetooth®, Zigbee®, and Near-Field Communication, enable computing devices (e.g., smartphones), also referred to as nodes, to communicate directly with each other instead of through a centralized point (e.g., a router). These technologies often have a maximum range between devices of a few centimeters (in the case of NFC) to around 20 meters, though some implementations may have substantially larger ranges.

SUMMARY

Embodiments of the present disclosure include a method, computer program product, and system for tracking items using tag-to-tag communication. The method comprises receiving, from a tag, a list of nearby tags. The list of nearby tags was generated by the tag communicating with neighboring tags. The method further comprises comparing the list of nearby tags to a reference list that includes all expected tags. The method further comprises determining whether the list of nearby tags matches the reference list.

By using a list of nearby tags that was generated by the tag communicating with neighboring tags, as opposed to a list generated by a user manually scanning each tag, embodiments of the present disclosure can reduce the amount of time required to determine whether all expected items in a given location are proper. Furthermore, human error can be reduced because the nearby tags list can be generated once all tags items are in their final position, as opposed to being scanned and then moved to a final location as is common in, for example, airline cargo loading.

Some embodiments further include storing, during an initialization of the tag, information regarding an item that the tag is attached to in a memory of the tag. These embodiments may enable both the generation of the list of nearby tags and also provide information for a human in the case of a discrepancy. For example, in some embodiments, the information stored in the tag can include a luggage ID and a travel itinerary associated with the luggage. The travel itinerary may enable a user (e.g., an airline employee) to ensure that all luggage that is expected on a flight is present, and that there is not any extraneous luggage that should not be on the flight.

Further embodiments of the present disclosure include a method, system, and computer program product for generating a list of nearby tags using tag-to-tag communication. The method comprises receiving, by a first tag, a group trigger for building a list of nearby tags. The method further comprises receiving a first list of nearby tags from a second tag. The method further comprises combining the first list of nearby tags with a list of nearby tags stored in the first tag. The method further comprises broadcasting the combined list of nearby tags to neighboring tags.

These embodiments may provide advantages in that they enable every tag in a given area to generate a complete list of tags in that area. This may be beneficial over current processes, which rely on humans manually scanning the tags, in that it may be more accurate and less time consuming.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
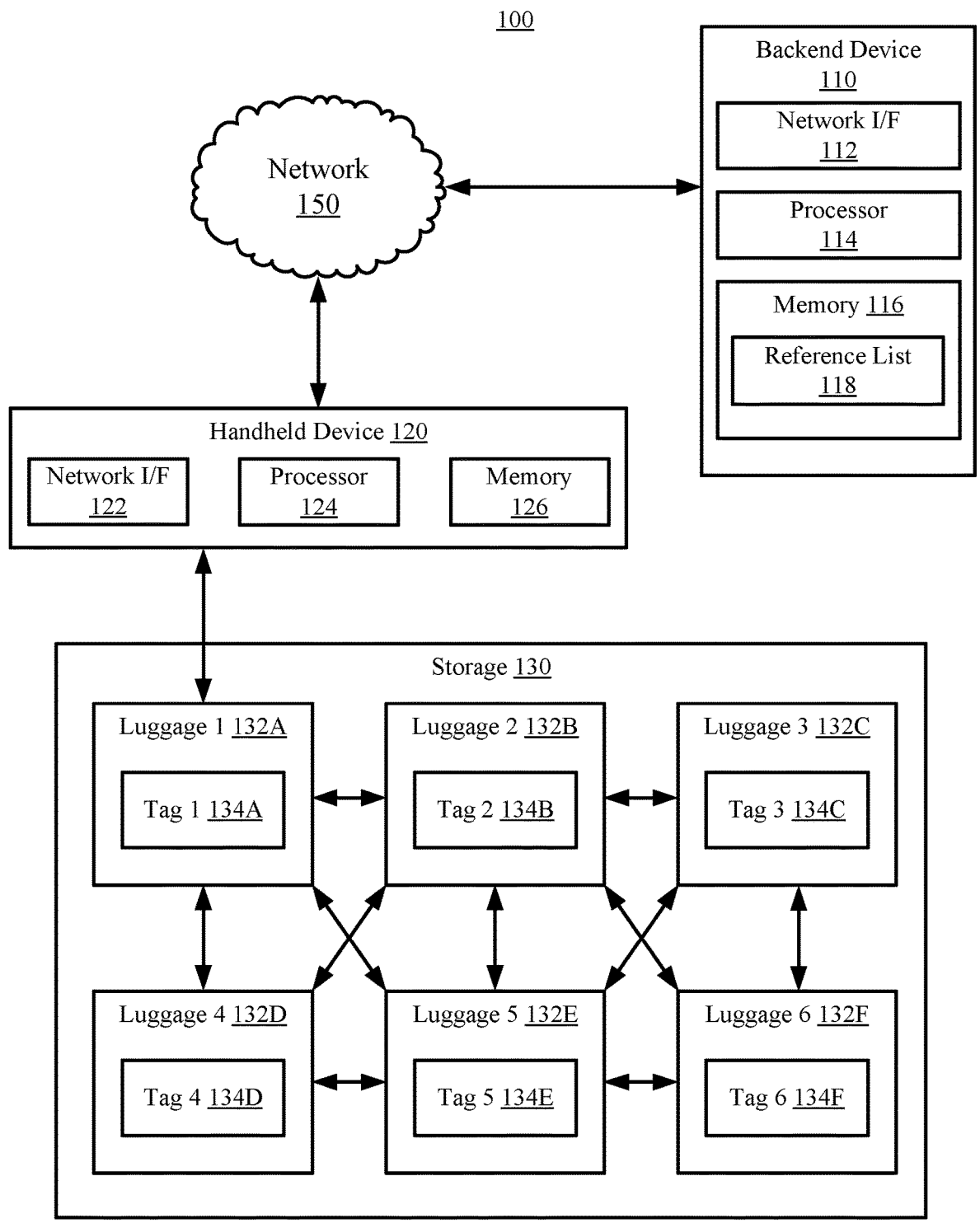
FIG. 1 illustrates a block diagram of a networked system for determining whether all of the luggage that is supposed to be in a storage area is there using smart tags, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of computing, and in particular to tags capable of building a list of neighboring tags using tag-to-tag communications. While the present disclosure is not necessarily limited to such applications, various aspects of the disclosure may be appreciated through a discussion of various examples using this context.

Embodiments of the present disclosure are discussed in the context of tracking luggage in air travel. However, it is to be understood that these examples are provided for illustrative purposes only, and they are not to be construed as limiting. Other applications of the tags disclosed herein are also contemplated. For example, embodiments of the present disclosure can be applied to freight or other shipping, inventory control and tracking, medicine distribution, and any other fields which benefit from accurate and quick determinations of what items are found in a given area.

Identification of a missing item or of an item in excess, within a set of items whose inventory is upfront known, is a persistent problem across many fields. An illustrating use case is searching for missing luggage or luggage in excess within the hold of an aircraft. It asks for airport staff to scan each and every luggage tag within the hold (which may further require emptying the hold), which takes a lot of time, is error prone, and can cause flight delays and cost airlines significant amounts of money. There are similar issues when loading or unloading luggage on/from tarmac trolleys at the luggage dispatch center of an airport.

Embodiments of the present disclosure may reduce or eliminate these issues using smart communicating tags, referred to herein as smart tags or simply tags, attached to luggage. The tags are capable to receive triggers launching tag-to-tag communications for building within each tag a replicated inventory of the set of items. Once such a replicated inventory is built, scanning any single tag attached to an item allows the person scanning the tag to get the inventory of the whole item set. The replicated inventory, also referred to herein as the nearby tags list, can be compared to a reference list that includes all of the luggage that is expected or supposed to be in the scanned area (e.g., airplane cargo hold, trolley, etc.). The system can quickly determine, by comparing the two lists, whether there is any missing or excess luggage in the scanned area. Compared to the conventional approach, this solution saves time and decreases the risk of errors by eliminating the need for each individual item to be scanned by hand when being moved and by reducing errors associated with luggage handling that occurs after manual scanning in traditional systems.

Take a passenger airline as an example. When passengers check their bags, a tag is attached to each piece of checked luggage. The tag is then initialized to include a unique Luggage Id (LId) for the luggage. Additionally, the tag is programmed to include an ordered list of airport Ids {AId1, AId2, . . . , AIdn}, where each airport ID (AIdi) uniquely identifies a flight to an airport where the luggage must be disembarked. Both LId and AIdi are initialized in the tag attached to the luggage during check-in. Furthermore, the tag is initialized in the "UNGROUP" state. The system back-end doing this initialization builds a reference list of all luggage that has to be carried on the first flight (e.g., out of AId1).

Prior to the flight's departure, an agent quickly checks that all luggage for the flight is present and that there are no bags incorrectly being loaded on the wrong flight. This can be done both at the exit of the Luggage Dispatching Center (LDC) when the luggage is loaded onto the trolleys bringing the luggage from the LDC to the aircraft, and also in the hold of the aircraft itself.

In order to check which luggage is present, an agent can send a group signal to any tag, which then rebroadcasts the group signal to all nearby tags. In response to receiving the group signal, the tags all switch from the "UNGROUP" state to the "GROUP" state with parameter AId1. This triggers the collective construction of the list of all luggage sharing parameter AId1, which is supposed to be available in each tag (possibly in different positions). The use of the parameter AId1 may prevent other tags, such as tags from nearby storage areas or in nearby planes, from activating if the signal reaches that far. This collective construction of the list, referred to herein as the nearby tags list, occurs by each tag sending out its tag information, along with any tag information that it has received from nearby tags. In other words, a given tag may receive information (e.g., itineraries and luggage IDs) from, for example, three nearby tags, combine them with its own information, and send out a combined list of four tags. This process may be allowed to repeat for a period of time such that all of the information propagates to all of the tags.

After a delay to allow each tag to build a complete nearby tags list, any tag is read to receive its nearby tags list. The nearby tags list is then compared with the reference list built by the back-end system during check in, which includes all of the tags that should be on the flight. If there is a discrepancy, the system can identify which baggage is missing or in excess (e.g., is on the plane, but should not be) and trigger ad hoc business processes for correcting the deficiency.

Once all of the luggage is loaded on the plane, the agent sends a trigger signal to the tags that puts them in the "UNGROUP" state, which causes the tags to purge their nearby tags list. In some embodiments, another trigger may be sent to put the luggage back in the "GROUP" state to rebuild the list and detect any deviation from the list established by the back-end system that may have occurred. Finally, a trigger signal may be sent to put the tags in a low power, or hibernate, mode during flight to conserve battery life. In some embodiments, the UNGROUP state is the low battery state.

On arrival of a flight, the same process may be repeated to quickly check that all luggage that must leave the aircraft has been removed from the hold, as well as ensure that the luggage is properly routed. Again, this can be done in the hold of the aircraft after unloading and/or at the entrance to the LDC. For example, the tag information can be used to ensure that all luggage that has arrived at its final destination (e.g., has the landing airport as its last airport in its itinerary) is routed to the carousel. Meanwhile, any luggage that needs to be transported to another flight can be routed to departure, and the tag information can be used to verify that this has occurred.

It is to be understood that the aforementioned advantages are example advantages and should not be construed as limiting. Embodiments of the present disclosure can contain all, some, or none of the aforementioned advantages while remaining within the spirit and scope of the present disclosure.

Turning now to the figures, FIG. 1 illustrates a block diagram of an example computing environment 100 for determining whether all of the luggage that is supposed to be in a storage area is there using smart tags, in accordance with embodiments of the present disclosure. The computing environment 100 includes a backend device 110, a handheld device 120, a network 150, and a plurality of tags 134A-134F (individually or collectively referred to as tags 134) present in the storage area 130.

Consistent with various embodiments, the backend device 110 and the handheld device 120 may be computer systems. The backend device 110 and the handheld device 120 may include one or more processors 114, 124 and one or more memories 116, 126, respectively. The backend device 110 and the handheld device 120 may be configured to communicate with each other through an internal or external network interface 112, 122. The network interfaces 112, 122 may be, for example, modems or network interface cards. The backend device 110 and/or the handheld device 120 may be equipped with a display or monitor. Additionally, the backend device 110 and/or the handheld device 120 may include optional input devices (e.g., a keyboard, mouse, scanner, or other input device), and/or any commercially available or custom software (e.g., browser software, communications software, server software, natural language processing software, search engine and/or web crawling software, filter modules for filtering content based upon predefined parameters, etc.). In some embodiments, the backend device 110 and/or the handheld device 120 may be servers, desktops, laptops, or hand-held devices.

The backend device 110 and the handheld device 120 may be distant from each other and communicate over a network 150. In some embodiments, the backend device 110 may be a central hub from which handheld devices 120 can establish a communication connection, such as in a client-server networking model. Alternatively, the backend device 110 and the handheld device 120 may be configured in any other suitable networking relationship (e.g., in a peer-to-peer configuration or using any other network topology).

In some embodiments, the network 150 can be implemented using any number of any suitable communications media. For example, the network 150 may be a wide area network (WAN), a local area network (LAN), an internet, or an intranet. In certain embodiments, the backend device 110 and the handheld device 120 may be local to each other and communicate via any appropriate local communication medium. For example, the backend device 110 and the handheld device 120 may communicate using a local area network (LAN), one or more hardwired connections, a wireless link or router, or an intranet. In some embodiments, the backend device 110 and the handheld device 120 may be communicatively coupled using a combination of one or more networks and/or one or more local connections. For example, the handheld device 120 may be hardwired to the backend device 110 (e.g., connected with an Ethernet cable) while a second handheld device (not shown) may communicate with the backend device using the network 150 (e.g., over the Internet).

In some embodiments, the network 150 can be implemented within a cloud computing environment, or using one or more cloud computing services. Consistent with various embodiments, a cloud computing environment may include a network-based, distributed data processing system that provides one or more cloud computing services. Further, a cloud computing environment may include many computers (e.g., hundreds or thousands of computers or more) disposed within one or more data centers and configured to share resources over the network 150. In some embodiments, the network 150 may be substantially similar to, the same as, or part of the cloud computing environment 50 described with respect to FIG. 8.

Each tag 134 is attached to an item, in this example luggage 132A-132F (collectively and individually referred to as luggage 132), found in a storage area 130, such as a cargo hold of an airplane, a luggage transport trolley, a warehouse, or the like. The handheld device 120 is configured to communicate with the tag(s) 134 using a short range communications protocol, such as Bluetooth®, Zigbee®, Near-Field Communication (NFC), for example. Similarly, the tags 134 are configured to communicate with each other using a short range communications protocol. For example, as shown in FIG. 1 by the arrows between individual luggage 132, the first tag 134A is able to communicate with the second tag 134B, the fourth tag 134D, and the fifth tag 134E. Meanwhile, the first tag 134A is unable to communicate with the third tag 134C or the sixth tag 134F. On the other hand, both the second and fifth tags 134B, 134E, which are located in roughly the middle of the storage area 130, are able to communicate with all other tags 134. Which other tags a particular tag is able to communicate with depends on physical distances between the tags 134, obstacles between the tags 134, and the communication protocol that the tags 134 are configured to use for inter-tag communications. In some embodiments, the short-range communication protocol may be selected to have a maximum range of approximately 10 meters. This helps ensure that the tags 134 do not communicate with tags in another storage area, such as in another plane.

The handheld device 120 is configured to send various signals/instructions to the tags 134, and the tags 134 are configured to perform certain operations in response to receiving different signals. For example, the handheld device 120 may send a group signal to the first tag 134A. This signal causes the first tag 134A to change its state to the GROUP state, whereby it is configured to create a list of all nearby tags 134. The first tag 134A may also be configured to rebroadcast the group signal to is neighboring tags (the second, fourth, and fifth tags 134B, 134D, 134E), which in turn rebroadcast the group signal to their neighbors, including the third and sixth tags 134C, 134F. Accordingly, the group signal effectively propagates outwards from the first tag 134A until each tag 134 in the storage area 130 is placed in the GROUP state. The tags 134 may thereby be connected to each other in an ad hoc network, whereby each tag is able to share its nearby tags list or other signals/commands directly or indirectly with every other tag in the ad hoc network.

Figures 2, 3, 4:
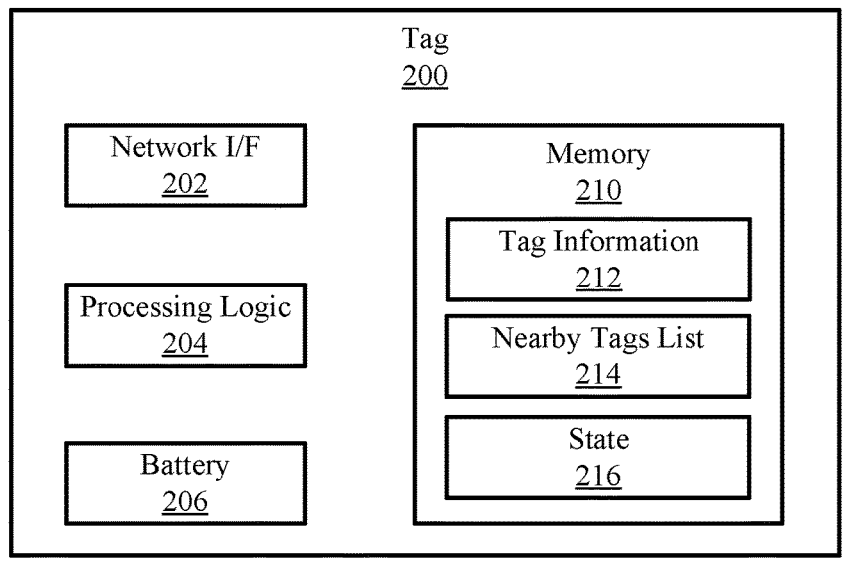
FIG. 2 illustrates a block diagram of a smart tag, in accordance with embodiments of the present disclosure.
FIG. 3 illustrates a table showing example luggage information, in accordance with embodiments of the present disclosure.
FIG. 4 illustrates a table showing a nearby tags list, in accordance with embodiments of the present disclosure.

While in the GROUP state, the tags 134 are also configured to merge received tag information from other tags 134 into the nearby tags lists, and then broadcast their nearby tags lists to neighboring tags 134. For example, after receiving the group signal from the handheld device 120, the first tag 134A may rebroadcast the group signal as well as send out its nearby tags list, which will initially only include its own tag information. An example of a tag's tag information, in this case luggage information, is shown in FIG. 3. The second tag 134B, for example, will receive the first tag's 134 tag information, combine it with its own tag information and any other tag information received from any other tag 134, and then broadcast the combined information. Like the group signal, this nearby tag list will propagate throughout the storage area 130 until every tag 134 stores a complete copy of the nearby tag list that includes all other tags. An example nearby tags list is shown in FIG. 4.

In some embodiments, the tags 134 may be configured to retransmit their nearby tag list periodically (e.g., every 200 milliseconds) for a predetermined period of time (e.g., 20 seconds), until it receives a signal instructing it to stop, or until an amount of time has passed since it received any new information. In some embodiments, the tags 134 may be configured to retransmit their nearby tag list (one or more times) only when the list has changed. For example, after initially sending out its nearby tag list a predetermined number of times, the second tag 134B may not transmit its list again until it receives a list from another tag that includes new information. In some embodiments, the tags 134 may be configured to perform some combination of the above. For example, the tags 134 may be configured to transmit their nearby tag lists every 200 milliseconds. However, once the tags have not received a nearby tags list with new information for 10 seconds, they may be configured to stop sending out their nearby tags lists. If they receive new information after the 10 seconds, they may be configured to switch to a different mode (e.g., only send the nearby tag list when they get new information), or their previous resend mode may be reset.

The handheld device 120 may further be configured to read the nearby tag list from any of the tags 134. For example, the handheld device 120 may send a group signal to the first tag 134A, causing all of the tags 134 to generate a nearby tags list as discussed above. After waiting some period of time to allow the nearby tag lists to be generated, the handheld device 120 may send a read signal. Because every tag 134 contains the full nearby tags list, the handheld device 120 can send the read signal to any tag 134, not just to the tag that it sent the group signal too (i.e., the first tag 134A). The read signal may cause the handheld device 120 to retrieve (or receive) the nearby tags list from the tag 134.

In some embodiments, a separate read signal may not be needed. For example, the handheld device 120 may passively collect all of the information from the tags 134 while the tags are building the nearby tags list by simply listening to the inter-tag communications. However, the read signal may still be used if the handheld device 120 is unable to listen to the inter-tag communications because it is not configured to understand them, is too far away from the tags to receive them while they are communicating with each other (e.g., if after sending the grouping signal, the handheld device 120 is moved, the communication protocols differ such that the grouping signal can be sent from farther away, etc.), or otherwise did not get a complete nearby tags list.

Once the handheld device 120 has the complete nearby tags list, the nearby tags list can be compared to the reference list 118. This may be done by the handheld device 120, the backend device 110, or both. The reference list 118 includes a complete list of items (e.g., luggage 132) that should be in the storage area 130. The reference list 118 can be generated during initialization of each tag. For example, the reference list 118 can be generated during check-in when bags are being checked and tags are being attached thereto by ticketing agents for an airline.

The handheld device 120, backend device 110, or both may be configured to alert a user if the nearby tags list and the reference list 118 do not match. The user may be alerted regardless of whether the nearby tags list indicates that a bag is missing from the storage area 130 or there is an extra bag in the storage area 130. In some embodiments, the alert can provide information about the missing/extra bag, such as what the associated luggage looks like. In some embodiments, if there is an extra bag in the storage area 130, the handheld device 120 can send an alert to the tags 134 about the extra bag. This may cause the tag 134 associated with the extra bag to activate an audible or visual alert, such as an alarm or light, to help locate the extra bag.

Once all of the luggage 132 is properly accounted for, the handheld device 120 can send an ungroup signal to the tags 134. This may cause the tags 134 to purge their nearby tags lists, retaining only their individual tag information, and go into a low power mode. As with the other signals described herein, the tags 134 may rebroadcast the signal to ensure that the signal propagates to all of the tags 134.

Referring now to FIG. 2, illustrated is a block diagram of a smart tag 200, in accordance with embodiments of the present disclosure. The smart tag 200 may be configured as described with respect to the tags 134 of FIG. 1. The tag 200 includes a network interface 202, processing logic 204, a battery 206, and a memory 210. The network interface 202 allows the tag 200 to communicate with other devices (e.g., handheld device 120 shown in FIG. 1) and other tags. The network interface 202 may be or include hardware for short range communications protocols, such as Bluetooth. The battery 206 may be any type of suitable battery, such as a lithium-ion battery.

The memory 210 includes tag information 212, nearby tags list 214, and state information 216. The tag information may include information about the item to which the tag 200 is attached, as well as information about the tag 200 itself. An example of tag information 212 in the context of tags used for tracking airline passenger luggage is shown in FIG. 3.

The nearby tags list 214 includes information about all nearby tags. The nearby tags list 214 may be generated through tag-to-tag communications, as disclosed herein. An example of a nearby tags list 214 in the context of tags used for tracking airline passenger luggage is shown in FIG. 4.

The state information 216 includes information pertaining to which state the tag 200 is in. In some embodiments, each tag 200 can be in one of three different states at any given time: the initialized (INIT) state, the GROUP state, and the UNGROUP state. The processing logic 204 is configured to perform various operations and respond to received signals depending on which state the tag 200 is in.

The INIT state is reached at power-on for tag 200 set-up and automatically switches to the UNGROUP state. When in the INIT state, the tag 200 can be programmed to include the specific tag information 212.

The UNGROUP state is the default state where the tag 200 waits for a grouping or group trigger/signal to move to the GROUP state. When in the UNGROUP state, the tag 200 does not store information about other tags in its nearby tags list 214. If the tag 200 receives a read or reading trigger/signal when in the UNGROUP state, the tag 200 will return a single element that comprises its tag information 212.

The GROUP state is the working state where the tag 200 is configured to exchange information to build the nearby tags list with other tags within a communicative range of the tag 200. Each tag 200 is configured to broadcast its own nearby tags list, which can be received by neighbors within range. Upon receiving a nearby tags list from another tag, the tag 200 merges its own list with the received one.

While in the GROUP state, the tag 200 can receive a trigger (e.g., from another system or device, such as a handheld device 120) to perform two different actions. If a read trigger, is received, the tag 200 returns the current nearby tags list 214. If an ungroup trigger is received, the current nearby tags list is cleared. The tag may be further configured to rebroadcast an ungroup trigger several times so that the other tags also receive this trigger. After a predetermined amount of time and/or after broadcasting the ungroup trigger a predetermined number of time, the tags 200 moves back to the UNGROUP state.

Referring now to FIG. 3, illustrated is a table 300 showing example tag information for a tag 320, in accordance with embodiments of the present disclosure. In particular, the tag information shown in FIG. 3 is for a tag 320 that is attached to an airline passenger's luggage.

As shown in the table 300, the tag 320 includes a luggage ID (LID) 304 and flight itinerary associated with the tagged luggage. For example, the tag information includes a first airport code (AId1) 306, a flight code (FId1) 308, a second airport code (AId2) 310, a second flight code (FId2) 312, a third airport code (AId3) 314, an nth flight code (FIdn) 316, and an nth airport code (AIdn) 318. This information can be used to determine whether the luggage is being routed to the correct plane during transit.

It is to be understood that the table 300 shown in FIG. 3 is an illustrative example and should not be construed as limiting. In some embodiments, the table 300 may contain more or fewer fields, and the individual fields may be different. For example, in some embodiments, the table 300 may include data regarding what the luggage looks like (e.g., color, size, distinguishing features, etc.). This may be useful when a user is attempting to find the luggage in response to determining that it is not in a storage area when it should be or is in the storage area when it should not be.

Similarly, other applications of the smart tags disclosed herein may utilize different information. For example, tags applied to shipping containers may contain some of the same information (e.g., locations where the containers are to be shipped), but they may contain other information, such as what type of cargo is in the container (e.g., medicine, clothing, etc.), whether there are any shipping restrictions (e.g., the cargo is fragile, the cargo must be kept cold/warm, etc.), or any other information that may assist in determining whether the cargo is in the right place or not.

Referring now to FIG. 4, illustrated is a table showing a nearby tags list 400, in accordance with embodiments of the present disclosure. In particular, the nearby tags list 400 shown in FIG. 4 is for a plurality of tags 420-428 that are attached to a plurality of airline passengers' luggage.

As shown in the table, nearby tags list 400 includes a luggage ID (LID) 404 and flight itinerary associated with the plurality of tagged luggage. As with the tag information shown in FIG. 3, the nearby tags list includes a first airport code (AId1) 406, a flight code (FId1) 408, a second airport code (AId2) 410, a second flight code (FId2) 412, a third airport code (AId3) 414, an nth flight code (FIdn) 416, and an nth airport code (AIdn) 418 for each piece of luggage. This information can be used to determine whether the luggage is being routed to the correct plane during transit.

As shown in FIG. 4, the tags do not all have the same first airport code AId1 406. This is because the fourth tag 426 did not get initialized at the same airport (RST) as the other tags, but rather was initialized at ORD. Its luggage ID 404 may be different from the other luggage IDs 404 for the same reason.

It is to be understood that the table 400 shown in FIG. 4 is an illustrative example and should not be construed as limiting. In some embodiments, the table 400 may contain more or fewer fields, and the individual fields may be different. For example, in some embodiments, the table 400 may include data regarding what the luggage looks like (e.g., color, size, distinguishing features, etc.). This may be useful when a user is attempting to find the luggage in response to determining that it is not in a storage area when it should be or is in the storage area when it should not be.

Figure 5:
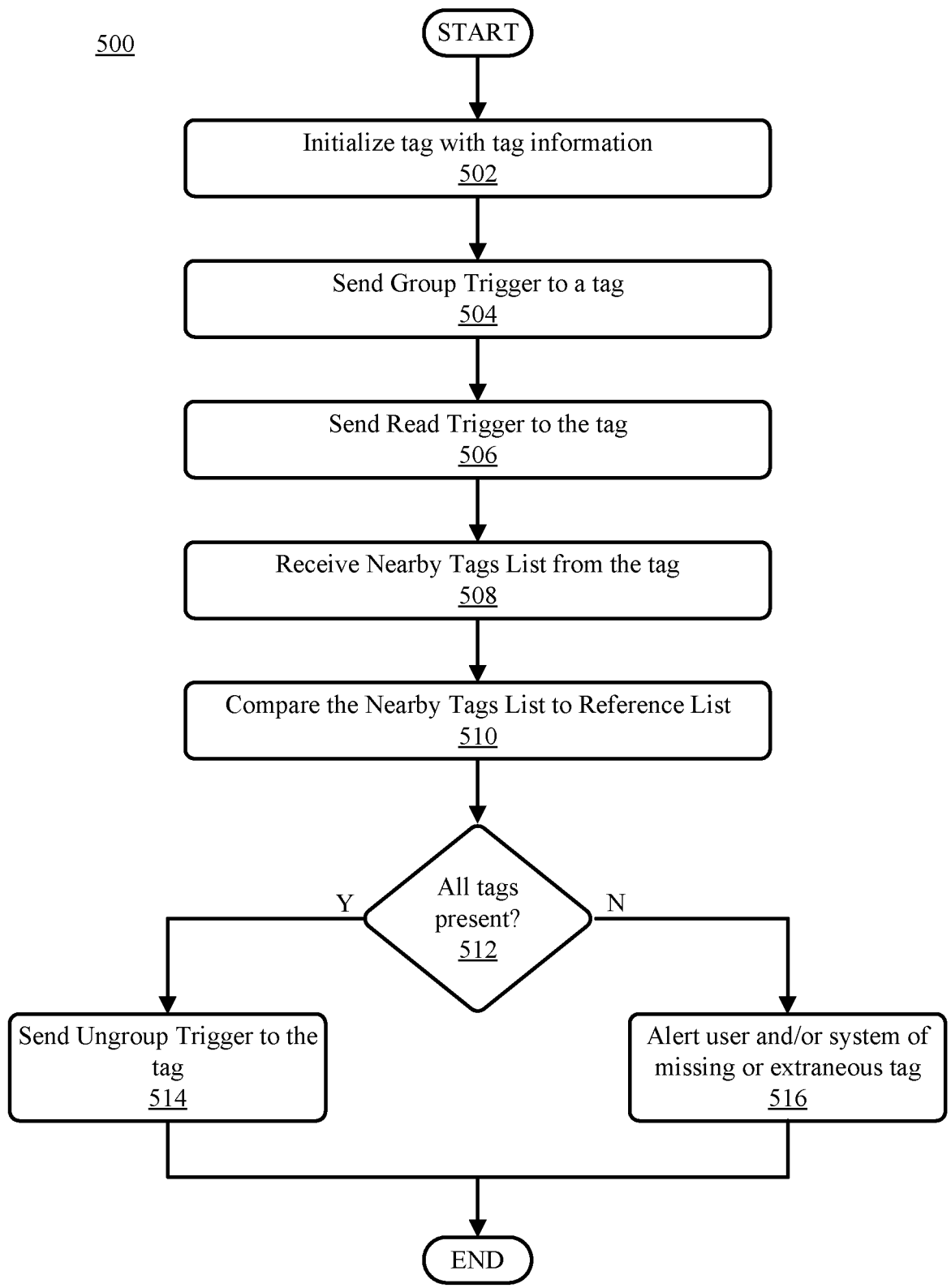
FIG. 5 illustrates a flowchart of an example method for determining whether all luggage is present in a storage area using smart tags, in accordance with embodiments of the present disclosure.

Referring now to FIG. 5, illustrated is a flowchart of an example method 500 for determining whether all luggage is present in a storage area using smart tags, in accordance with embodiments of the present disclosure. The method 500 may be performed by hardware, firmware, software executing on a processor, or any combination thereof. For example, the method 500 may be performed by a processor (e.g., in a handheld device 120 or a backend device 110). The method 500 may begin at operation 502, where a tag is initialized with its tag information.

As disclosed herein, the tag information includes information identifying and/or describing the tag and item to which the tag is attached. For example, if the tag is attached to a passenger's luggage, the tag information may contain a luggage ID and a list of airports that are in the passenger's travel itinerary. If the tag is attached to an item being shipped, it may include a list of distribution centers that the item will pass through during transit.

In some embodiments, initializing the tag includes putting the tag in the INIT state, and then storing the tag information in the tag. Initializing the tag may also include changing the tag's state to UNGROUP after it has been programmed to include its tag information. Furthermore, initializing the tag may automatically create an entry for the tag in one or more reference lists. For example, if the tag is attached to a luggage that will travel from a first airport to a second airport, and then be moved to another airplane to travel along a connecting flight to a third airport, the tag information may be added to reference lists for each of the first, second, and third airports.

At operation 504, a group trigger may be sent to the tag. Operation 504 may be performed by a system for tracking the luggage. The group trigger (also referred to herein as a group signal) may cause the tag to enter the GROUP state, create an ad hoc network of tags within a communicative range, and build a nearby tags list that includes the tag information of all nearby tags, as discussed herein.

At operation 506, a read trigger may be sent to a tag. The read trigger may enable the system to read (e.g., receive) the nearby tags list from the tag. For example, the read trigger may instruct the tag to send its complete nearby tags list to the system. Because each tag shares its nearby tag list with every other tag in the ad hoc network such that each tag contains an identical, and complete, copy of the nearby tags list, the read trigger may be sent to any tag. In some embodiments, the read trigger may be sent to the same tag that the group trigger was sent to. In other embodiments, the read trigger may be sent to another tag in the ad hoc network of tags.

In some embodiments, the read trigger may be automatically sent some amount of time after the group trigger is sent. For example, the system may be configured to send the read trigger 15 seconds after the group trigger. This may provide the tags enough time to propagate the complete nearby tags list throughout the entire ad hoc network of tags. In some embodiments, a user may manually trigger the read trigger.

In operation 508, the system receives the nearby tags list from the tag. The system then compares the nearby tags list to the associated reference list at operation 510. As discussed herein, the reference list may be generated during initialization of the tags such that it includes entries for every single tag that should be in the same area. For example, the reference list for a flight may include all tags that should be in a cargo hold of the airplane assigned to perform that flight.

At decision block 512, the system determines whether all expected tags are present, and that there are not any unexpected tags in the list. This is done based on the comparison performed at operation 510. If all tags are not present (i.e., there is a tag missing from the nearby tags list), or if there is an extraneous tag in the area (i.e., there is a tag in the nearby tags list that is not on the reference list), a user or other system may be alerted at operation 516 and the method 500 may end. In embodiments where the tags are attached to luggage, this may include alerting a baggage system of the discrepancy. If, however, all tags are present and the nearby tag list matches the reference list, the system may send an ungroup trigger to the tag at operation 514. The ungroup trigger may cause the tags to delete their nearby tags list and transition into the UNGROUP state. After sending the ungroup trigger at operation 514, the method 500 may end.

In some embodiments, alerting the user and/or system at operation 516 may include sending an alert trigger to a tag. This may be done when an extraneous tag is found. As with the other triggers, the alert trigger may propagate through the ad hoc network. Once it reaches the tag that matches the extraneous tag ID (i.e., once it reaches the tag that is not on the reference list), it may cause the tag to generate an audible or visible alert. For example, the tag may emit a noise or light to assist in finding it so that it can be removed, if necessary, or otherwise inspected. The alert generated at operation 516 may also include sending information about the item associated with the tag (e.g., luggage) to a user, such as its color, size, or other description of it, to help a user identify it, even if the tag is unable to produce an alert of its own.

Figure 6A:
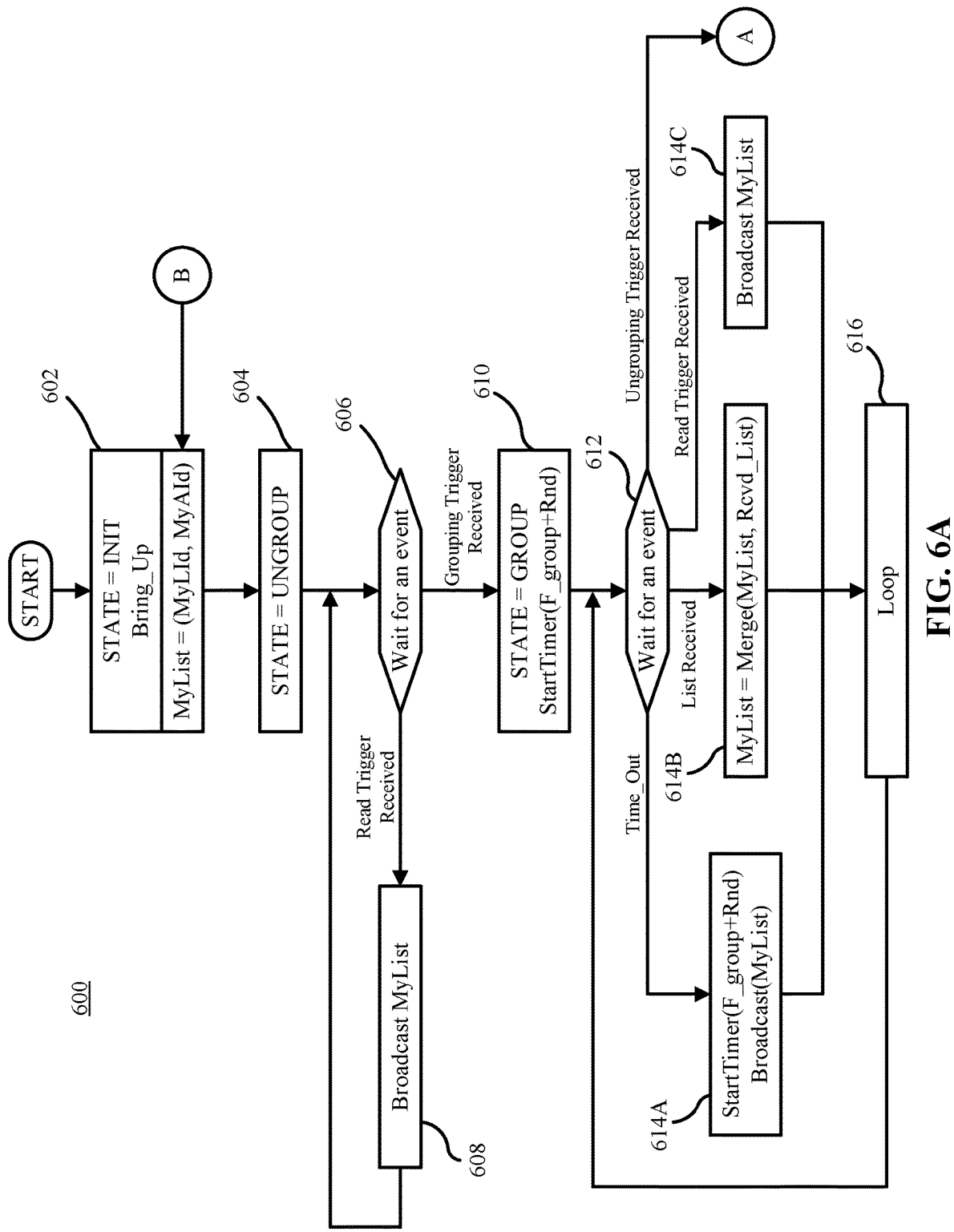
FIGS. 6A and 6B illustrate a flowchart of an example method for generating and transmitting a nearby tags list, in accordance with embodiments of the present disclosure.
Figure 6B:
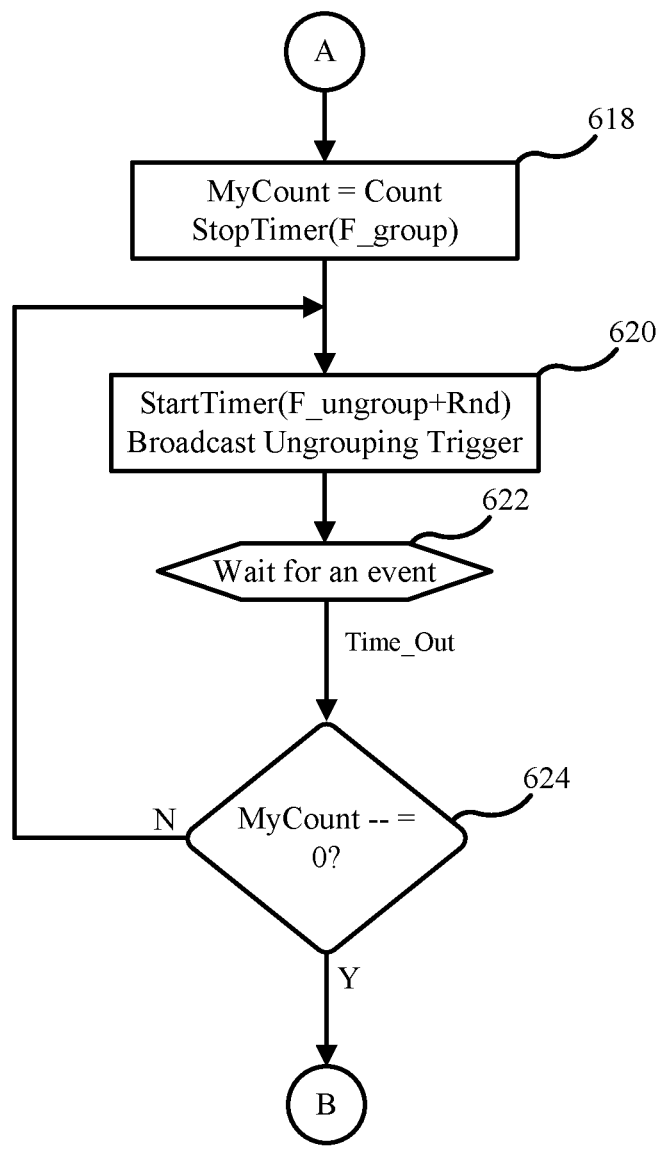

Referring now to FIGS. 6A and 6B, illustrated is a flowchart of an example method 600 for generating and transmitting a nearby tags list, in accordance with embodiments of the present disclosure. The method 600 may be performed by hardware, firmware, software executing on a processor, or any combination thereof. For example, the method 600 may be performed by a processor or processing logic embedded in a smart tag (e.g., processing logic 204 shown in FIG. 2). The method 600 may begin at operation 602, wherein a tag is initialized. During initialization, the state of the tag may be set to an initialization state (INIT), and an initial nearby tags list (MyList) may be generated. Initially, the nearby tags list may only include the tag information for the tag. For example, the nearby tags list may include the luggage ID and airport ID(s) associated with the tag.

At operation 604, the tag may transition from the INIT state to the UNGROUP state. That may be done automatically after generating the nearby tags list, a predetermined amount of time after entering the INIT state, or in response to a trigger or command received from another system (e.g., a backend system or remote system, such as the handheld system).

At operation 606, the tag may wait for an event or other trigger. If a read trigger is received while the tag is waiting in the UNGROUP state, the tag broadcasts its nearby tags list at operation 608. Because the tag is in the UNGROUP state, the nearby tags list will only include the tag information programmed into the tag during the initialization of the tag.

In response to receiving a grouping trigger (also referred to herein as a group trigger), the tag transitions into the GROUP state at operation 610. Transitioning to the GROUP state at operation 610 may also include starting a group timer. The group timer is used to trigger the broadcasting of the nearby tags list. In other words, whenever the group timer expires (i.e., times out), the tag is configured to broadcast its nearby tags list. This is done with a frequency F_group+Rnd. F_group is common to all tags, but to limit the occurrences of collisions between signals broadcast from different tags, a random value (Rnd) is added to F_group. This random value Rnd may be different for each tag. In some embodiments, the random value Rnd is determined (e.g., using a pseudo-random number generator or function) each time the timer is started. This ensures that each tag broadcasts its nearby tags list with a different frequency, reducing the number of collisions.

At operation 612, the tag waits for an event or other trigger. Unlike operation 606, at operation 612, the tag waits in the GROUP state. While in the GROUP state, the tag may periodically broadcast its nearby tags list to other tags. Similarly, it may periodically broadcast a group trigger so that other nearby tags can be placed in the GROUP state to create an ad hoc network of tags.

If a timeout occurs when waiting at operation 612, the tag broadcasts its nearby tags list MyList and restarts the timer as in operation 610. The timer again has a time equal to F_group+Rnd. In some embodiments, the random value Rnd may be the same random value used previously, while in other embodiments, it may be a new random value. Then control is given to operation 616 for returning to operation 612, where other events are waited for It the tag receives a nearby tags list from another tag while in the GROUP state, the tag merges the received nearby tags list with its own list at operation 614B. After merging the nearby tags lists, the tag enters a loop at operation 616 and returns to operation 612, where it waits for other events.

If a read trigger is received, the tag broadcasts its nearby tags list at operation 614C. In some embodiments, the tag may broadcast its nearby tags list in much the same way that broadcasts its list to other tags. However, in some embodiments, the nearby tags list broadcast at operation 614C may be different so that the nearby tags list can be received by another system, such as a handheld device, as opposed to other tags. Accordingly, broadcasting the nearby tags list at operation 614C may include broadcasting the nearby tags list using a different format that can be read by the other system or using a different communications protocol. For example, the tags may be configured to communicate with a handheld device or other remote system using one communications protocol (e.g., Bluetooth), while they communicate with other tags using a second, different communications protocol (e.g., Zigbee). After broadcasting the nearby tags list, the tag enters a loop at operation 616 and returns to operation 612, where it waits for other events.

If an ungroup trigger is received while the tag is in the GROUP state, the tag may proceed with operations 618-624, which are shown in FIG. 6B. At operation 618, the tag initializes a variable MyCount, which tracks how many ungroup signals the tag still has to broadcast. The variable MyCount is initialized to a default value (Count), which is the maximum/total number of ungroup signals to be sent. Additionally, the tag stops the group timer that was first started at operation 610.

At operation 620, the tag starts a new ungroup timer and broadcasts an ungrouping trigger. The ungroup timer is used to trigger the broadcasting of the ungrouping trigger. In other words, whenever the ungroup timer expires (i.e., times out), the tag is configured to broadcast the ungrouping trigger. This is done with a frequency F_ungroup+Rnd. F_ungroup is common to all tags, but to limit the occurrences of collisions between signals broadcast from different tags, a random value (Rnd) is added to F_ungroup. This random value Rnd may be different for each tag. In some embodiments, the random value Rnd is determined (e.g., using a pseudo-random number generator or function) each time the timer is started. This ensures that each tag broadcasts the ungrouping trigger with a different frequency, reducing the number of collisions.

At operation 622, the tag waits for an event. In particular, the tag waits for the ungroup timer to time out. Once the ungroup timer times out, the tag decrements the variable MyCount and determines whether the decremented value is equal to 0. This is shown at decision block 624. A value of 0 indicates that the ungrouping trigger should no longer be broadcast.

If the decremented value of MyCount is determined to be zero at decision block 624, the method 600 returns to the initialized state, shown in FIGS. 6A and 6B as returning to operation 602. In some embodiments, this includes clearing out the nearby tags list such that only the tag's tag information remains. If the decremented value of MyCount is not 0, the method 600 returns to operation 620 and the ungrouping trigger is again broadcast and a new ungrouping timer is started.

In some embodiments, some of the operations in FIG. 6B may be performed in simultaneous, as opposed to sequential, order, or they may be performed in a different order. For example, the variable MyCount may be decremented when the ungrouping trigger is broadcast (e.g., at operation 620) instead of when the timeout occurs. Similarly, the group timer may be stopped at the same time as, or even after, the ungroup timer is started.

Figure 7:
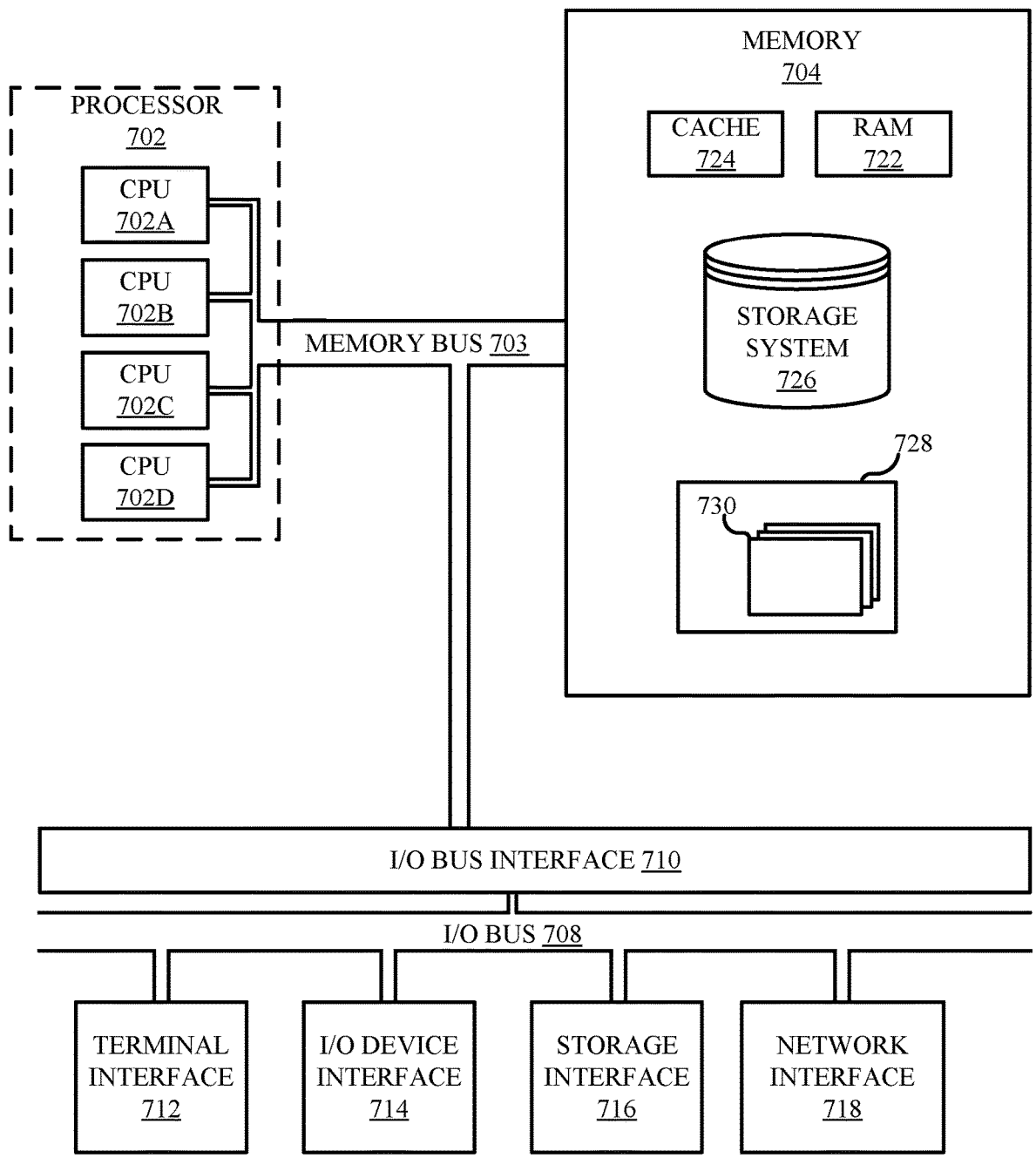
FIG. 7 illustrates a high-level block diagram of an example computer system that may be used in implementing one or more of the methods, tools, and modules, and any related functions, described herein, in accordance with embodiments of the present disclosure.

Referring now to FIG. 7, shown is a high-level block diagram of an example computer system 701 that may be used in implementing one or more of the methods, tools, and modules, and any related functions, described herein (e.g., using one or more processor circuits or computer processors of the computer), in accordance with embodiments of the present disclosure. In some embodiments, the major components of the computer system 701 may comprise one or more CPUs 702, a memory subsystem 704, a terminal interface 712, a storage interface 716, an I/O (Input/Output) device interface 714, and a network interface 718, all of which may be communicatively coupled, directly or indirectly, for inter-component communication via a memory bus 703, an I/O bus 708, and an I/O bus interface unit 710.

The computer system 701 may contain one or more general-purpose programmable central processing units (CPUs) 702A, 702B, 702C, and 702D, herein generically referred to as the CPU 702. In some embodiments, the computer system 701 may contain multiple processors typical of a relatively large system; however, in other embodiments the computer system 701 may alternatively be a single CPU system. Each CPU 702 may execute instructions stored in the memory subsystem 704 and may include one or more levels of on-board cache.

System memory 704 may include computer system readable media in the form of volatile memory, such as random access memory (RAM) 722 or cache memory 724. Computer system 701 may further include other removable/non-removable, volatile/non-volatile computer system storage media. By way of example only, storage system 726 can be provided for reading from and writing to a non-removable, non-volatile magnetic media, such as a "hard drive." Although not shown, a magnetic disk drive for reading from and writing to a removable, non-volatile magnetic disk (e.g., a "floppy disk"), or an optical disk drive for reading from or writing to a removable, non-volatile optical disc such as a CD-ROM, DVD-ROM or other optical media can be provided. In addition, memory 704 can include flash memory, e.g., a flash memory stick drive or a flash drive. Memory devices can be connected to memory bus 703 by one or more data media interfaces. The memory 704 may include at least one program product having a set (e.g., at least one) of program modules that are configured to carry out the functions of various embodiments.

One or more programs/utilities 728, each having at least one set of program modules 730 may be stored in memory 704. The programs/utilities 728 may include a hypervisor (also referred to as a virtual machine monitor), one or more operating systems, one or more application programs, other program modules, and program data. Each of the operating systems, one or more application programs, other program modules, and program data or some combination thereof, may include an implementation of a networking environment. Program modules 730 generally perform the functions or methodologies of various embodiments.

Although the memory bus 703 is shown in FIG. 7 as a single bus structure providing a direct communication path among the CPUs 702, the memory subsystem 704, and the I/O bus interface 710, the memory bus 703 may, in some embodiments, include multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 710 and the I/O bus 708 are shown as single respective units, the computer system 701 may, in some embodiments, contain multiple I/O bus interface units 710, multiple I/O buses 708, or both. Further, while multiple I/O interface units are shown, which separate the I/O bus 708 from various communications paths running to the various I/O devices, in other embodiments some or all of the I/O devices may be connected directly to one or more system I/O buses.

In some embodiments, the computer system 701 may be a multi-user mainframe computer system, a single-user system, or a server computer or similar device that has little or no direct user interface, but receives requests from other computer systems (clients). Further, in some embodiments, the computer system 701 may be implemented as a desktop computer, portable computer, laptop or notebook computer, tablet computer, pocket computer, telephone, smart phone, network switches or routers, or any other appropriate type of electronic device.

It is noted that FIG. 7 is intended to depict the representative major components of an exemplary computer system 701. In some embodiments, however, individual components may have greater or lesser complexity than as represented in FIG. 7, components other than or in addition to those shown in FIG. 7 may be present, and the number, type, and configuration of such components may vary. Furthermore, the modules are listed and described illustratively according to an embodiment and are not meant to indicate necessity of a particular module or exclusivity of other potential modules (or functions/purposes as applied to a specific module).

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure comprising a network of interconnected nodes.

Figure 8:
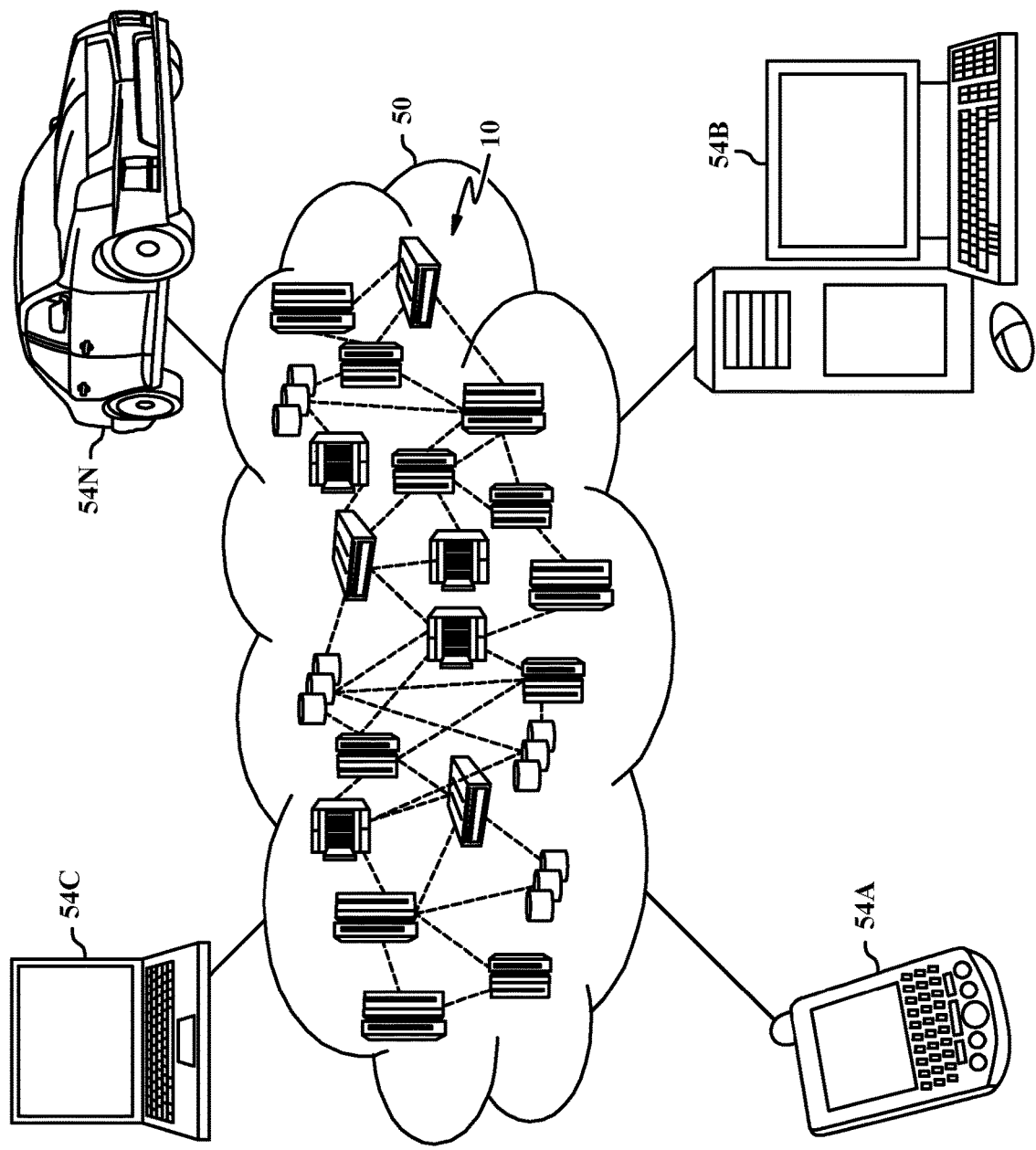
FIG. 8 depicts a cloud computing environment, in accordance with embodiments of the present disclosure.

Referring now to FIG. 8, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 8 are intended to be illustrative only and that computing nodes 10 and cloud computing environment 50 can communicate with any type of computerized device over any type of network and/or network addressable connection (e.g., using a web browser).

Figure 9:
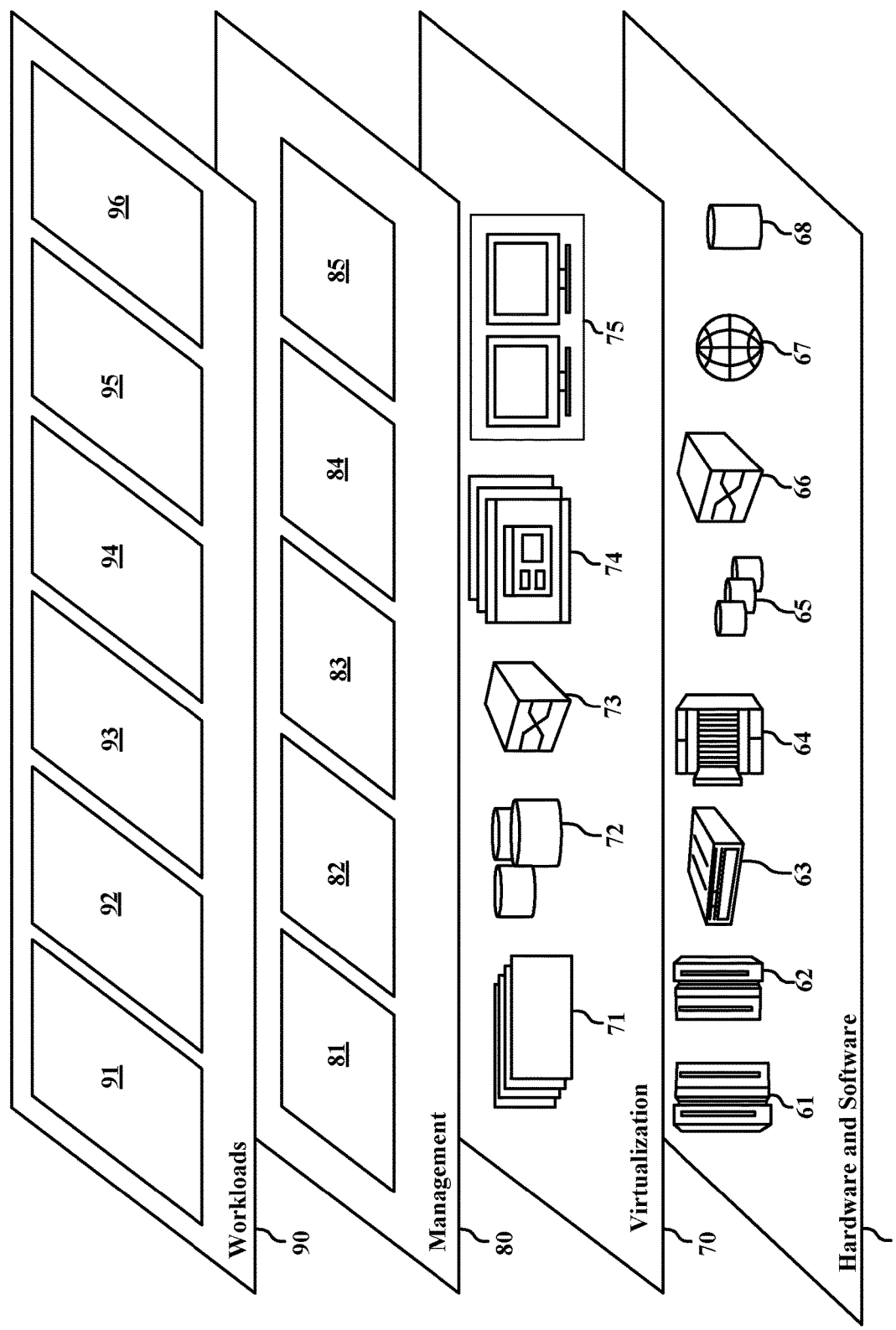
FIG. 9 depicts abstraction model layers, in accordance with embodiments of the present disclosure.

Referring now to FIG. 9, a set of functional abstraction layers provided by cloud computing environment 50 (FIG. 8) is shown. It should be understood in advance that the components, layers, and functions shown in FIG. 9 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and item tracking application 96. The item tracking application 96 may include instructions for performing various functions disclosed herein, such as the tracking of items using smart tags.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the various embodiments. As used herein, the singular forms "a," "an," and "the" are intended to include the plural forms as well, unless the context clearly indicates otherwise. It will be further understood that the terms "includes" and/or "including," when used in this specification, specify the presence of the stated features, integers, steps, operations, elements, and/or components, but do not preclude the presence or addition of one or more other features, integers, steps, operations, elements, components, and/or groups thereof. In the previous detailed description of example embodiments of the various embodiments, reference was made to the accompanying drawings (where like numbers represent like elements), which form a part hereof, and in which is shown by way of illustration specific example embodiments in which the various embodiments may be practiced. These embodiments were described in sufficient detail to enable those skilled in the art to practice the embodiments, but other embodiments may be used and logical, mechanical, electrical, and other changes may be made without departing from the scope of the various embodiments. In the previous description, numerous specific details were set forth to provide a thorough understanding the various embodiments. But, the various embodiments may be practiced without these specific details. In other instances, well-known circuits, structures, and techniques have not been shown in detail in order not to obscure embodiments.

As used herein, "a number of" when used with reference to items, means one or more items. For example, "a number of different types of networks" is one or more different types of networks.

When different reference numbers comprise a common number followed by differing letters (e.g., 100a, 100b, 100c) or punctuation followed by differing numbers (e.g., 100-1, 100-2, or 100.1, 100.2), use of the reference character only without the letter or following numbers (e.g., 100) may refer to the group of elements as a whole, any subset of the group, or an example specimen of the group.

Further, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combinations of these items can be present. In some illustrative examples, "at least one of" can be, for example, without limitation, two of item A; one of item B; and ten of item C; four of item B and seven of item C; or other suitable combinations.

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

In the foregoing, reference is made to various embodiments. It should be understood, however, that this disclosure is not limited to the specifically described embodiments. Instead, any combination of the described features and elements, whether related to different embodiments or not, is contemplated to implement and practice this disclosure. Many modifications, alterations, and variations may be apparent to those of ordinary skill in the art without departing from the scope and spirit of the described embodiments. Furthermore, although embodiments of this disclosure may achieve advantages over other possible solutions or over the prior art, whether or not a particular advantage is achieved by a given embodiment is not limiting of this disclosure. Thus, the described aspects, features, embodiments, and advantages are merely illustrative and are not considered elements or limitations of the appended claims except where explicitly recited in a claim(s). Additionally, it is intended that the following claim(s) be interpreted as covering all such alterations and modifications as fall within the true spirit and scope of the invention.

Example Embodiments

A non-limiting list of example embodiments are provided hereinafter to demonstrate some aspects of the present disclosure. Example embodiment 1 is a method. The method includes receiving, from a tag, a list of nearby tags, wherein the list of nearby tags was generated by the tag communicating with neighboring tags. The method further comprises comparing the list of nearby tags to a reference list that includes all expected tags. The method further comprises determining whether the list of nearby tags matches the reference list.

Example embodiment 2 includes the method of example embodiment 1, including or excluding optional features. In this example embodiment, receiving the list of nearby tags comprises sending a first command to a first tag, the first command causing the first tag to communicate with the neighboring tags and generate the list of nearby tags. Receiving the list of nearby tags in this example embodiment further comprises sending, after sending the first command, a second command to a second tag, wherein the second command is a request for the list of nearby tags.

Example embodiment 3 includes the method of any one of example embodiments 1 to 2, including or excluding optional features. In this example embodiment, the method includes storing, during an initialization of the tag, information regarding an item that the tag is attached to in a memory of the tag. Optionally, the item is luggage, and the information stored in the tag includes a luggage ID and a travel itinerary associated with the luggage.

Example embodiment 4 includes the method of any one of example embodiments 1 to 3, including or excluding optional features. In this example embodiment, the method includes alerting, in response to determining that the list of nearby tags does not match the reference list, a user. Optionally, alerting the user comprises sending information regarding a discrepancy between the nearby tags list and the reference list to the user, wherein the information includes one or more selected from the group consisting of information about a particular tag in the nearby tags list that is not in the reference list and information about a particular tag in the reference list that is not in the nearby tags list.

Example embodiment 5 is a system. The system includes a memory and a processor communicatively coupled to the memory, wherein the processor is configured to perform a method. The method includes receiving, from a tag, a list of nearby tags, wherein the list of nearby tags was generated by the tag communicating with neighboring tags. The method further comprises comparing the list of nearby tags to a reference list that includes all expected tags. The method further comprises determining whether the list of nearby tags matches the reference list.

Example embodiment 6 includes the system of example embodiment 5, including or excluding optional features. In this example embodiment, receiving the list of nearby tags comprises sending a first command to a first tag, the first command causing the first tag to communicate with the neighboring tags and generate the list of nearby tags. Receiving the list of nearby tags in this example embodiment further comprises sending, after sending the first command, a second command to a second tag, wherein the second command is a request for the list of nearby tags.

Example embodiment 7 includes the system of any one of example embodiments 5 to 6, including or excluding optional features. In this example embodiment, the method further comprises storing, during an initialization of the tag, information regarding an item that the tag is attached to in a memory of the tag. Optionally, the item is luggage, and the information stored in the tag includes a luggage ID and a travel itinerary associated with the luggage.

Example embodiment 8 includes the system of any one of example embodiments 5 to 7, including or excluding optional features. In this example embodiment, the method further comprises alerting, in response to determining that the list of nearby tags does not match the reference list, a user. Optionally, alerting the user comprises sending information regarding a discrepancy between the nearby tags list and the reference list to the user. The information may include one or more selected from the group consisting of information about a particular tag in the nearby tags list that is not in the reference list and information about a particular tag in the reference list that is not in the nearby tags list.

Example embodiment 9 is a computer program product comprising a computer readable storage medium having program instructions embodied therewith. The computer-readable medium includes instructions that direct the processor to perform a method. The method includes receiving, from a tag, a list of nearby tags, wherein the list of nearby tags was generated by the tag communicating with neighboring tags. The method further comprises comparing the list of nearby tags to a reference list that includes all expected tags. The method further comprises determining whether the list of nearby tags matches the reference list.

Example embodiment 10 includes the computer-readable medium of example embodiment 9, including or excluding optional features. In this example embodiment, receiving the list of nearby tags comprises sending a first command to a first tag, the first command causing the first tag to communicate with the neighboring tags and generate the list of nearby tags. Receiving the list of nearby tags in this example embodiment further comprises sending, after sending the first command, a second command to a second tag, wherein the second command is a request for the list of nearby tags.

Example embodiment 11 includes the computer-readable medium of any one of example embodiments 9 to 10, including or excluding optional features. In this example embodiment, the method further comprises storing, during an initialization of the tag, information regarding an item that the tag is attached to in a memory of the tag. Optionally, the item is luggage, and the information stored in the tag includes a luggage ID and a travel itinerary associated with the luggage.

Example embodiment 12 includes the computer-readable medium of any one of example embodiments 9 to 11, including or excluding optional features. In this example embodiment, the method further comprises alerting, in response to determining that the list of nearby tags does not match the reference list, a user. Optionally, alerting the user comprises sending information regarding a discrepancy between the nearby tags list and the reference list to the user. The information includes one or more selected from the group consisting of information about a particular tag in the nearby tags list that is not in the reference list and information about a particular tag in the reference list that is not in the nearby tags list.

Example embodiment 13 is a method. The method includes receiving, by a first tag, a group trigger for building a list of nearby tags. The method further includes receiving, from a second tag, a first list of nearby tags. The method further includes combining, by the tag, the first list of nearby tags with a list of nearby tags stored in the first tag. The method further includes broadcasting the combined list of nearby tags to neighboring tags.

Example embodiment 14 includes the method of example embodiment 13, including or excluding optional features. In this example embodiment, the method further comprises rebroadcasting, by the first tag, the group trigger to the neighboring tags.

Example embodiment 15 includes the method of any one of example embodiments 13 to 14, including or excluding optional features. In this example embodiment, the method includes receiving, from a remote device, a read trigger, and transmitting, to the remote device, the list of nearby tags.

Example embodiment 16 includes the method of any one of example embodiments 13 to 15, including or excluding optional features. In this example embodiment, the method includes establishing, by the first tag and the neighboring tags, an ad hoc network with all other tags located within a communicative range of the first tag and neighboring tags using a short range communications protocol.

Example embodiment 17 is a smart tag. The smart tag includes a memory and a processor communicatively coupled to the memory, wherein the processor is configured to perform a method. The method comprises receiving, by a first tag, a group trigger for building a list of nearby tags. The method further comprises receiving, from a second tag, a first list of nearby tags. The method further comprises combining, by the first tag, the first list of nearby tags with a list of nearby tags stored in the first tag. The method further comprises broadcasting the combined list of nearby tags to neighboring tags.

Example embodiment 18 includes the smart tag of example embodiment 17, including or excluding optional features. In this example embodiment, the method further comprises establishing, by the first tag and the neighboring tags, an ad hoc network with all other tags located within a communicative range of the first tag and neighboring tags using a short range communications protocol.

Example embodiment 19 includes the smart tag of any one of example embodiments 17 to 18, including or excluding optional features. In this example embodiment, the method further comprises receiving, from a remote device, a read trigger requesting the list of nearby tags. The method further comprises transmitting, to the remote device, the list of nearby tags using a short range communications protocol.

What is claimed is:
1. A method comprising:
transmitting, to a tag, a group trigger;
receiving, from a tag, a list of nearby tags;
comparing the list of nearby tags to a reference list that
   includes all expected tags;

determining whether the list of nearby tags matches the reference list; and transmitting, to the tag, an ungroup trigger.

2. The method of claim 1, wherein receiving the list of nearby tags comprises:

sending a first command to a first tag, the first command causing the first tag to communicate with a plurality of neighboring tags and generate the list of nearby tags; and sending, after sending the first command, a second command to a second tag, wherein the second command is a request for the list of nearby tags.

3. The method of claim 1, the method further comprising:

storing, during an initialization of the tag, information regarding an item that the tag is attached to in a memory of the tag.

4. The method of claim 3, wherein the item is luggage, and wherein the information stored in the tag includes a luggage ID and a travel itinerary associated with the luggage.

5. The method of claim 1, the method further comprising:

alerting, in response to determining that the list of nearby tags does not match the reference list, a user.

6. The method of claim 5, wherein alerting the user comprises sending information regarding a discrepancy between the nearby tags list and the reference list to the user, wherein the information includes one or more selected from the group consisting of:

information about a particular tag in the nearby tags list that is not in the reference list; and information about a particular tag in the reference list that is not in the nearby tags list.

7. A system comprising:

a memory; and a processor communicatively coupled to the memory, wherein the processor is configured to perform a method comprising:

transmitting, to a tag, a group trigger;

receiving, from the tag, a list of nearby tags, wherein the list of nearby tags was generated by the tag combining a plurality of tag lists received from a plurality of neighboring tags;

comparing the list of nearby tags to a reference list that includes all expected tags;

determining whether the list of nearby tags matches the reference list; and transmitting, to the tag, an ungroup trigger.

8. The system of claim 7, wherein receiving the list of nearby tags comprises:

sending a first command to a first tag, the first command causing the first tag to communicate with the neighboring tags and generate the list of nearby tags; and sending, after sending the first command, a second command to a second tag, wherein the second command is a request for the list of nearby tags.

9. The system of claim 7, wherein the method further comprises:

storing, during an initialization of the tag, information regarding an item that the tag is attached to in a memory of the tag.

10. The system of claim 9, wherein the item is luggage, and wherein the information stored in the tag includes a luggage ID and a travel itinerary associated with the luggage.

11. The system of claim 7, wherein the method further comprises:

alerting, in response to determining that the list of nearby tags does not match the reference list, a user.

12. The system of claim 11, wherein alerting the user comprises sending information regarding a discrepancy between the nearby tags list and the reference list to the user, wherein the information includes one or more selected from the group consisting of:

information about a particular tag in the nearby tags list that is not in the reference list; and information about a particular tag in the reference list that is not in the nearby tags list.

13. A computer program product comprising a computer readable storage medium having program instructions embodied therewith, the program instructions executable by a computer to perform a method comprising:

transmitting, to a tag, a group trigger;

receiving, from the tag, a list of nearby tags, wherein the list of nearby tags was generated by the tag combining a plurality of tag lists received from a plurality of neighboring tags, wherein each respective tag list of the plurality of tag lists was received from a different neighboring tag and includes a list of tags within communicative range of the neighboring tag that provided the respective tag list;

comparing the list of nearby tags to a reference list that includes all expected tags;

determining whether the list of nearby tags matches the reference list; and transmitting, to the tag, an ungroup trigger.

14. The computer program product of claim 13, wherein receiving the list of nearby tags comprises:

sending a first command to a first tag, the first command causing the first tag to communicate with the neighboring tags and generate the list of nearby tags; and sending, after sending the first command, a second command to a second tag, wherein the second command is a request for the list of nearby tags.

15. The computer program product of claim 13, wherein the method further comprises:

storing, during an initialization of the tag, information regarding an item that the tag is attached to in a memory of the tag.

16. The computer program product of claim 15, wherein the item is luggage, and wherein the information stored in the tag includes a luggage ID and a travel itinerary associated with the luggage.

17. The computer program product of claim 13, wherein the method further comprises:

alerting, in response to determining that the list of nearby tags does not match the reference list, a user.

18. The computer program product of claim 17, wherein alerting the user comprises sending information regarding a discrepancy between the nearby tags list and the reference list to the user, wherein the information includes one or more selected from the group consisting of:

information about a particular tag in the nearby tags list that is not in the reference list; and information about a particular tag in the reference list that is not in the nearby tags list.

* * * * *